United States Patent [19]
Spaar

[11] 3,724,645
[45] Apr. 3, 1973

[54] CONVEYOR BELT CONSTRUCTION

[75] Inventor: Gerd Spaar, Cologne, Germany

[73] Assignee: Clouth Gummiwerke Aktiengesellschaft, Cologne, Germany

[22] Filed: May 4, 1971

[21] Appl. No.: 140,061

[30] Foreign Application Priority Data

May 5, 1970 Germany..................P 20 21 947.0

[52] U.S. Cl.......................198/193, 24/38, 74/231 J, 74/237, 156/157
[51] Int. Cl.............................................B65g 15/36
[58] Field of Search...24/38; 74/231 J, 237; 156/157, 156/159; 198/193

[56] References Cited

UNITED STATES PATENTS

| | | | |
|---|---|---|---|
| 3,481,807 | 12/1969 | Kanamori | 24/38 X |
| 3,234,611 | 2/1966 | Paasche | 24/38 |
| 1,612,024 | 12/1926 | Jacobs | 198/193 X |
| 2,839,651 | 6/1958 | Erickson | 198/193 X |
| 2,955,065 | 10/1960 | Paul | 74/237 X |

FOREIGN PATENTS OR APPLICATIONS

| | | | |
|---|---|---|---|
| 1,225,923 | 9/1966 | Germany | 198/193 |
| 256,253 | 12/1964 | Australia | 198/193 |

*Primary Examiner*—Evon C. Blunk
*Assistant Examiner*—W. Scott Carson
*Attorney*—Michael S. Striker

[57] ABSTRACT

Two conveyor belt portions which are reinforced with cables, are connected with one another. The cables are arrange din groups of three or four and have end portions of different lengths. According to the invention every end-portion in each group of one conveyor belt portion — except for the shortest portion of the group — is located (when the portions are connected with one another) between two end portions of cables of the other portion, and the shortest end portion of the group is located adjacent the longest end portion of the group with which it is connected.

3 Claims, 3 Drawing Figures

CONVEYOR BELT CONSTRUCTION

BACKGROUND OF THE INVENTION

The present invention relates generally to conveyor belts, and more particularly to conveyor belts which are reinforced with elongated flexible elements. Still more specifically the present invention relates to a connection for such conveyor belts or sections thereof.

When conveyor belts or conveyor belt sections which are reinforced with elongated flexible elements, such as steel cables, ropes or the like, are connected at their ends, the cables of each cable belt or belt sections are divided into groups each of which contains the same number of cables. The number of cables in each group corresponds to the number of stages of connections between the conveyor belt or belt sections. In each group the endportions of the cables have different lengths, that is one cable is longer than another, and a third cable is longer than the preceding two, and so on. The difference in length between the shortest cable and the next-longest cable or cable endportion is the same as the difference between the next longest cable and the cable which is still longer. Hereafter this difference is referred to as the length differential.

It is known from the prior art that in connecting two conveyors or conveyor belt sections the length differential in a so-called three-cable group or three-stage connection, that is a construction in which the cables are arranged in groups of three, in one-third of the length of the connection. In a so-called four cable group or four stage connection the length differential is a quarter of this length, and so on.

The most frequently used connection of this type is a three-cable connection described in the German Preliminary DIN 22 131, page 4. In this connection the short and intermediate cable endportions of each conveyor belt section are located adjacent an endportion of a cable in the other conveyor belt section over a third of the length of the connection established between the sections. The long cable endportions are located between two cable endportions of the other section, being located at one side for a third of the connection and on the other side over the entire length of the connection adjacent a cable of the other section. This means that the total length over which the cable endportions of one cable group of one conveyor belt section are located next to cable endportions of a group of cables in the other conveyor belt section, corresponds to twice the length of the connection. This length is an important and essential factor with respect to the tensile strength of the connection which is established between the sections.

SUMMARY OF THE INVENTION

It is an object of the present invention to further improve the strength of such a connection.

More particularly it is an object of the present invention to provide such a connection which not only has greater tensile strength but also can be constructed as a four-stage connection or a connection having even a greater number of stages.

In pursuance of the above objects, and of others which will become apparent hereafter, one feature of the invention recites in a conveyor belt composed of at least two belt sections whose adjacent ends are connected, with a plurality of elongated flexible laterally adjacent reinforcing members provided in each belt section. The reinforcing members are arranged in groups of at least three having at the end of the respective conveyor section a longest, a shortest and an intermediate endportion. Each endportion except for the shortest endportion of each group of one belt section is located between two endportions of reinforcing members of the other belt section, and the shortest endportion of each group of the one belt section is located adjacent to the longest endporton of a group of reinforcing members of the other belt section.

In this manner the length over which the cable endportions of one section are located adjacent to the cable endportions of the other section, is substantially increased, with a concomitant increase in the tensile strength of the connection thus established. This increase in the tensile strength, on the other hand, makes it possible to reduce the length of the connection and thereby to save not only material but also manufacturing time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
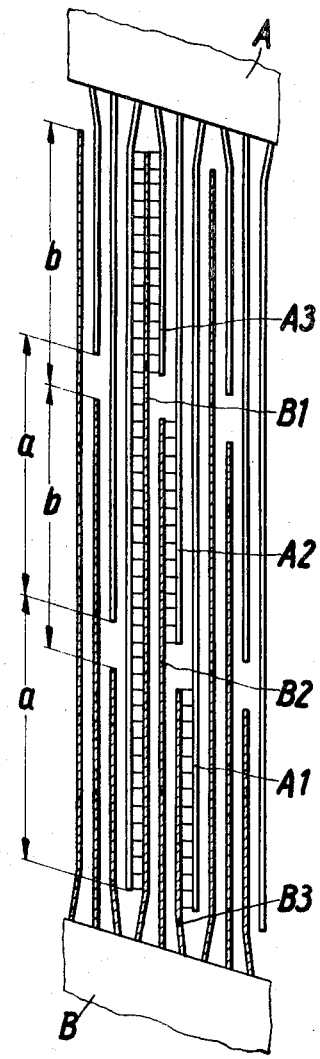
FIG. 1 is a diagrammatic fragmentary plan view of a prior-art conveyor belt connection.

The embodiment illustrated in FIG. 1 shows the connection of two conveyor belt sections A and B (only the endportions thereof are illustrated) in accordance with the prior art, and more particularly in accordance with German Preliminary DIN 22 131. Each of the conveyor belt sections A and B is reinforced with steel cables which are arranged in groups of three each. How the conveyor belt sections are constructed otherwise is of no importance. Each group of cables has a long cable endportion A1, an intermediate endportion A2 which is shorter than the endportion A1, and a short cable endportion A3 which is shorter than the intermediate endportion A2. These are the cable endportions of the cables associated with the conveyor belt section A, and correspondingly the cables in the section B are similarly arranged and designated at their cable endportions with reference designations B1, B2 and B3.

The length differential $a$ between the long cable endportion A1 and the intermediate cable endportion A2 on the one hand, as well as between the intermediate endportion A2 and the short endportion A3 on the other hand, is approximately identical. The same is true for the length differential $b$ between the endportions B1 and B2 on the one hand, and the endportions B2 and B3 on the other hand. In addition, the length differential a and b are also approximately identical with one another.

In FIG. 1 the region in which cable endportions of the one conveyor belt section are located adjacent to cable endportions of the other conveyor belt section are identified in FIG. 1 by the identical horizontal shading. It is pointed out that this has been done only for the group B1, B2 and B3 because this is believed sufficient for an understanding. The length of this region corresponds to approximately double (or six-thirds) of the length of the connection between the sections A and B. This refers, of course, to the total length at which one arrives by adding together all the shaded areas in FIG. 1.

Figure 2:
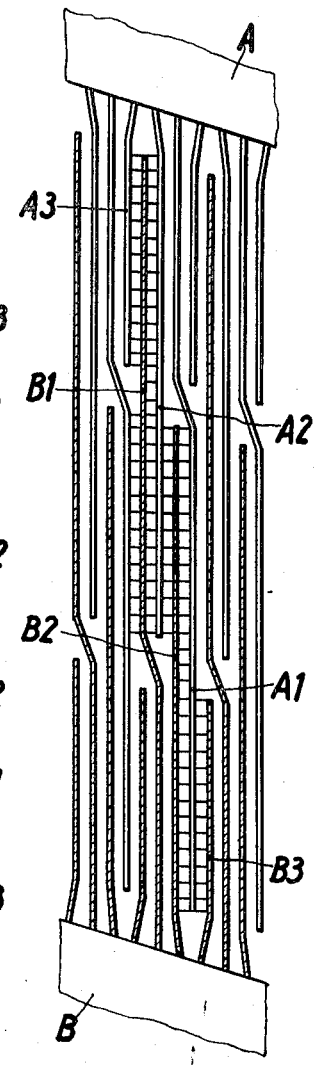
FIG. 2 is a view similar to FIG. 1 but illustrating a three-stage connection according to the present invention.

In the embodiment according to FIG. 2, that is the first embodiment of the present invention, the same reference numerals have been utilized as in FIG. 1 to facilitate comparison. In fact, all other factors described with respect to FIG. 1 are applicable also to FIG. 2 except that, in accordance with the present invention, all cable endportions of each group of cables in one belt section A in FIG. 2 (except for the shortest cable endportion) are located between two cable endportions of a group of the other conveyor belt section B, and the shortest cable endportion of the group is located next to the longest cable endportion of the corresponding group of the other belt section.

Again, the areas in which cable endportions of one conveyor belt section are located adjacent to cable endportions of another conveyor belt section, is indicated in FIG. 2 for comparison by horizontal shading. It will be noted that the combined length of the horizontally shaded areas in this Figure is greater than in the prior-art embodiment shown in FIG. 1, and corresponds to approximately eight-thirds of the length of the connection as opposed to only six-thirds in FIG. 1.

Figure 3:
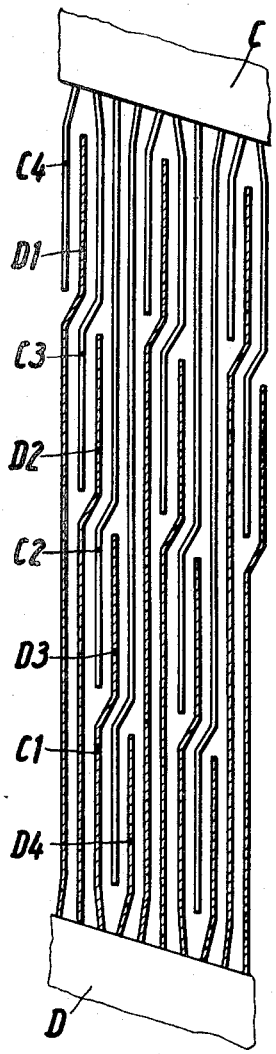
FIG. 3 is a view similar to FIG. 2 but illustrating a four-stage connection according to the present invention.

The embodiment in FIG. 3 corresponds to that in FIG. 2, except that here the cables are arranged in groups of four and each of the conveyor belt sections C and D is provided with cables whose groups of four have respective cable endportions C1, C2, C3 and C4 in the section C, whereas those in the section D have the cable endportions D1, D2, D3 and D4. It is clear that the arrangement of the cable endportions in FIG. 3 is the same as in FIG. 2 in that all cable endportions of one group (except for the shortest one) are each located between two cable endportions of a group of the respectively other conveyor belt section, and that the shortest cable endportion of the first group is located adjacent the longest cable endportion of the associated group of the other belt section. In this embodiment, as in FIG. 2, a substantial increase of the areas corresponding to those shown with horizontal shading in FIGS. 1 and 2 is achieved, with an increase in the tensile strength of the connection between the conveyor belt sections.

It will be appreciated that the present invention is applicable irrespective of whether two conveyor belt sections are to be connected, or whether the opposite ends of one and the same section are to be connected, and that it is immaterial whether the cables are of steel or another metal, or whether in fact they are ropes rather than cables and consist partially or completely of nonmetallic material.

It will be understood that each of the elements described above, or two or more together, may also find a useful application in other types of constructions differing from the types described above.

While the invention has been illustrated and described as embodied in a conveyor belt construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a conveyor belt having at least two connected endsections, a plurality of elongated flexible laterally adjacent reinforcing members in each endsection, and reinforcing members being arranged in groups of at least three having in each of the respective endsections a longest, a shortest and an intermediate endportion, each endportion except for the shortest endportions of each group of one endsection being located between two endportions of reinforcing members of the other endsection, and the shortest endportion of each group of said one endsection being located adjacent to the longest endportion of a group of reinforcing members of said other endsection.

2. In a conveyor belt as defined in claim 1, wherein said reinforcing members are metal cables.

3. In a conveyor belt as defined in claim 1, wherein said reinforcing members are ropes.

* * * * *